S. BUDLONG & W. O. TALCOTT.
Belt-Fastener.
No. 215,567.  Patented May 20, 1879.
Fig. 1.
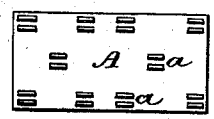
Fig. 2.
Fig. 3.
Fig. 4.
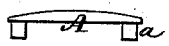
Fig. 6.
Fig. 5.
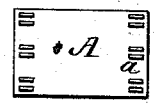
Fig. 7.
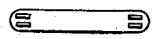
Fig. 8.  Fig. 9.
 
Fig. 10.  Fig. 11.
 
Fig. 12.
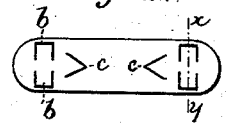
Fig. 13.
Witnesses:
Philip F. Larned
A. B. Cauldwell
Inventors:
Simeon Budlong and
Walter O. Talcott
By Wm C. Mood
Attorney

UNITED STATES PATENT OFFICE.

SIMEON BUDLONG AND WALTER O. TALCOTT, OF PROVIDENCE, R. I.

IMPROVEMENT IN BELT-FASTENERS.

Specification forming part of Letters Patent No. 215,567, dated May 20, 1879; application filed May 3, 1878.

*To all whom it may concern:*

Be it known that we, SIMEON BUDLONG and WALTER O. TALCOTT, both of the city and county of Providence, in the State of Rhode Island, have invented certain new and useful Improvements in Belt-Fasteners; and we do hereby declare that the following specification, taken in connection with the drawings furnished and forming a part thereof, is a clear, true, and complete description of our invention.

The object of our invention is to attain in metallic belt-fasteners a capacity for strong and reliable connection with the belt without the exposure of metal on the pulley side of the belt.

The main feature of our invention is a belt-fastener composed of a plate provided with a series of unequally-beveled teeth, which, on being driven into a belt, are thereby bent to the one side or the other and securely held against retraction. These teeth may be made in any desired form; but another portion of our invention consists in a plate provided with a series of chisel-shaped teeth, with the bevel thereof on one side only, so that when driven into a belt the bevel of each tooth will cause it to bend toward its opposite or straight side, and be thereby firmly embedded in the belt.

Our invention further consists in a belt-fastener composed of a plate provided with a series of teeth arranged in pairs, and beveled on their coincident or on their opposite sides, so that on being driven into a belt the teeth of each pair will be bent either away from or toward each other.

Another feature of our invention consists in a belt-fastener composed of a plate provided with a series of teeth on opposite sides thereof, whereby, on being interposed between the layers of a double belt at its ends, a joint will be attained without the exposure of the plate on either surface of the belt. This portion of our invention is not limited to teeth of any particular kind, although we prefer the beveled teeth described.

To more particularly describe our invention, we will refer to the accompanying drawings, in which—

Figures 1 and 2 represent, in top view and section, a belt-fastener adapted for use with double belts, and provided with chisel-teeth arranged in pairs. Fig. 3 represents, in section, this belt-fastener as applied to a double belt. Figs. 4 and 5 represent, in side view and plan, a surface-fastener for single belts. Figs. 6 and 7 represent, in side view and plan, a belt-fastener with a single pair of teeth at each end. Figs. 8 and 9 represent, respectively, in side and edge views, pointed teeth embodying our invention. Figs. 10 and 11 represent, in side and edge views, respectively, a half-crescent-shaped tooth embodying one feature of our invention. Fig. 12 represents, in top view, a fastener embodying our invention, in which the teeth are formed by slitting the sheet metal of which the plate is composed. Fig. 13 is a sectional view of Fig. 12, through line $x\,y$, after the teeth have been bent down and beveled.

In each instance, A denotes the plate of the fastener. It may be made of cast or rolled brass, iron, or sheet-steel. The plate, such as is shown in Figs. 1, 2, and 3, is preferably made of sheet metal. Those shown in Figs. 4 to 7 may be made of cast-brass, or of iron or steel struck up in a die. The plate shown in Figs. 12 and 13 should be made of soft steel plate.

The teeth may be largely varied in form and have chisel ends, as shown in Figs. 1 to 7 and in Figs. 12 and 13, or be pointed, as in Figs. 8 and 9, or half-crescent-shaped, as in Figs. 10 and 11.

When arranged for double belts, as in Figs. 1 to 3, inclusive, the plate may be provided with rectangular openings for receiving the double-ended teeth $a$, and these may be secured in place by soft solder or other suitable means. These teeth may be variously distributed on the plate; but it is preferable that they be arranged in pairs, as shown.

In Fig. 2 it will be seen that the beveled sides of the teeth of each pair are coincident, and therefore when driven into a belt each tooth bends or curves away from its fellow, as shown in Fig. 3. The portion of the belt embraced between the teeth when first entered causes the teeth to promptly turn outward.

When the teeth are beveled on their opposite sides and are straight on the coincident sides, the ends of the teeth will approach each other as they advance into the leather; but it will be seen that in both cases they cannot be retracted. The chisel-edged tooth is very desirable; but the pointed or crescent shapes shown in Figs. 8 to 11, inclusive, are very strong, and cut the belt to a somewhat less extent on being driven.

The blanks for such fasteners as are shown in Figs. 6 and 7 may be struck up in dies, and fine iron or steel may be used. These blanks may be cheaply finished, and the teeth sawed and beveled with machinery adapted to the purpose.

The fastener shown in Figs. 12 and 13, made of thin steel plate, with the teeth cut therein and bent downward or upward, or both, as the case may be, is well adapted for single or double belts, and can be cheaply made. The beveling of the teeth may be effected by compressing-dies or milling-tools, and they can be made with chisel ends, like teeth *b*, or pointed, like teeth *c*.

It will be seen that when applied to a belt, as shown, the teeth, being unequally beveled, are practically clinched without projecting through the belt, and that for that reason the liability to tear and rupture is greatly lessened, and the pulley side of the belt is always smooth and capable of performing full service.

The plates of fasteners for single belts or for surface application should always be rounded on their outer surfaces in line with the belt, and also have rounded corners, to obviate liability of catching any adjacent object with which they may come in contact.

Having thus described our invention, we claim as new and desire to secure by Letters Patent—

1. A metallic belt-fastener composed of a plate provided with a series of unequally-beveled teeth, which, on being driven into a belt, will be bent to the one side or the other, substantially as described.

2. A metallic belt-fastener consisting of a plate provided with a series of chisel-shaped teeth, having the bevel thereof on one side only, substantially as described.

3. A belt-fastener plate provided with a series of teeth arranged in pairs, and beveled on their coincident or on their opposite sides, substantially as described, whereby on being driven into a belt the ends of the teeth of each pair will be bent away from or toward each other, as set forth.

4. A belt-fastener plate provided with a series of teeth on each side of said plate, substantially as described, whereby a double belt may be jointed without exposure of metal on either side thereof, as set forth.

SIMEON BUDLONG.
WALTER ORLANDO TALCOTT.

Witnesses to signature of Simeon Budlong:
JOHN C. PURKIS,
GILMAN E. JOPP.

Witnesses to signature of W. O. Talcott:
THO. L. FORREST,
C. W. KIMBALL.